April 5, 1960
M. PLANIN
2,931,125
FISH HOOK DISGORGERS
Filed June 11, 1956
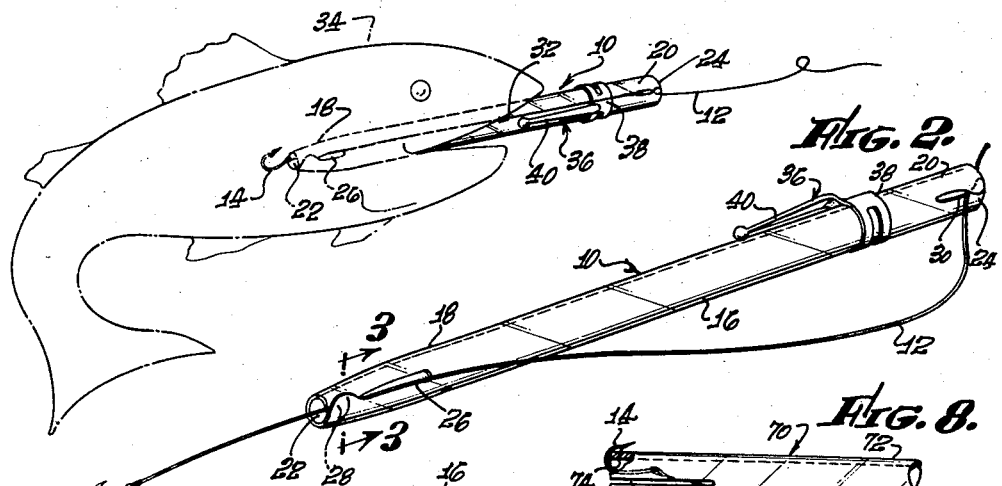
Mike Planin,
INVENTOR.
BY
Ed. D. O'B----
ATTORNEY.

United States Patent Office 2,931,125
Patented Apr. 5, 1960

2,931,125

FISH HOOK DISGORGERS

Mike Planin, Montebello, Calif.

Application June 11, 1956, Serial No. 590,782

2 Claims. (Cl. 43—53.5)

This invention relates to new and improved fish hook disgorgers.

The problem of removing a fish hook from the mouth of a fish would appear to many individuals not familiar with the actual details of this problem to be of very simple character. This, however, is not entirely the case. Frequently it is desired to remove a fish hook from the mouth of a very small fish. If the obvious means for this purpose such as, for example, a pair of pliers are employed to remove a hook from the mouth of a small fish of this category, there is a great deal of danger of the mouth of the fish being ripped open to a sufficient extent so as to either kill the fish or so as to permanently injure the fish in such a manner that it cannot survive in its natural habitat.

A basic object of this invention is to provide a fish hook disgorger which can be easily and satisfactorily employed so as to remove a fish hook from the mouth of even a very small fish without seriously injuring the fish. A further object of this invention is to provide a device of the class described which may be easily and cheaply manufactured. A still further object of this invention is to provide a fish hook disgorger which may be employed with a minimum of difficulty by fishermen and which may be readily cleaned following use as desired.

It is not to be assumed from the aforegoing discussion that this invention is limited to fish hook disgorgers which can be employed with very small fish of the so-called "undersized" category. The invention is primarily intended to be used with small fish of this variety and with various game fish of normal size having comparatively small mouths. The problem of removing hooks from such small mouthed game fish is essentially the same as the problem of removing a hook from the mouth of an undersized fish since it is normally desired to remove the hook in such a manner as not to damage the game fish so that this game fish will satisfactorily survive in either a tank or upon a fish stringer. The disgorgers of the invention can, if desired, be used with fishes of virtually any size and dimension.

Another object of this invention is to provide devices of the class described utilizing certain structural features necessary for these devices to be of a compact, lightweight, rigid structure so as to enable the devices of the present invention to be of a multi-purpose, utilitarian character. Thus, it is possible with the instant invention to form a fish hook disgorger out of an elongated, generally cylindrical member so that the interior of this member may be used for a variety of different purposes such as, for example, storing bait, fish lures or flies, small hooks or weights, or the like. With the invention, a generally cylindrical shape, as indicated in the preceding sentence, is desirable for a variety of reasons. Certain of these reasons relate to the fact that a generally cylindrical device of this category possesses comparatively large strength and resistance to bending and the like, while simultaneously requiring a comparatively small amount of material. This, in turn, means that the entire weight of the device is comparatively low. Further, when a cylindrical shape is used, a large bulky structure such as is encountered with various conventional fish hook disgorgers, is eliminated, and a composite structure is obtained which may be easily carried in a pocket or in various cases and the like.

Because of the nature of this invention, it is not considered that it is necessary to further explain in detail all of the various different objects and advantages of it. Such objects and advantages will be apparent to those skilled in the art to which this invention pertains from a detailed analysis of the remainder of this specification and including the appended claims and the accompanying drawing, in which:

Fig. 1 is a perspective view illustrating the use of a fish hook disgorger of this invention;

Fig. 2 is an enlarged perspective view illustrating the structure of the disgorger shown in Fig. 1;

Fig. 3 is a cross sectional view taken at line 3—3 of Fig. 2 of the drawing;

Fig. 4 is a side elevational view of a modified fish hook disgorger of this invention;

Fig. 5 is a side view, partially in section, of the modified fish hook disgorger of this invention shown in Fig. 4;

Fig. 6 is a perspective view of a second modified fish hook disgorger of the present invention;

Fig. 7 is a partial perspective view of a modified cap structure which may be employed with either of the modified forms of the invention shown in Fig. 4 or 6 of the drawing;

Figs. 8 and 9 are partial side elevational views showing various slot structures which may be employed with the invention;

Fig. 10 is a partial perspective view of another modified disgorger of this invention;

Fig. 11 is an end view of the disgorger shown in Fig. 10;

In all figures of the drawing, like numerals are used to designate like parts whenever convenient for purposes of illustration and explanation. It is to be understood that this invention is not to be limited by the various illustrated forms of it inasmuch as a number of modifications may be made in the structures shown without departing from the essential nature of the inventive concept present herein. Further, no attempt has been made to illustrate to any precise scale the preferred forms of the invention set forth in the various figures of the drawing inasmuch as the actual dimensions may be varied depending upon availability of materials, different manufacturing processes and the like.

It may be stated, by way of a summary which will help in understanding this invention, that it concerns fish hook disgorgers formed utilizing an elongated, generally cylindrical member having ends, at least one of which is open, and means formed on said elongated, generally cylindrical member adjacent to said ends, said means being adapted so as to be used in engaging a fish line so as to hold said line adjacent to said member so as to project out through an open end of said member whereby a disgorger may be moved with respect to a fish line so as to be extended into the mouth of a fish in order to engage the curved portion of a fish hook attached to this line. When in this position, force may be applied to the hook so as to cause removal of it from the mouth of the fish without damaging the mouth of this fish any material amount. The invention is, of course, much more fully summarized by the appended claims, and, as indicated in the preceding discussion, relates to a large extent to utilitarian, multipurpose structures each serving as a fish hook disgorger and for other purposes as indicated.

The exact nature of this invention will be more fully apparent from a consideration of the accompanying drawing. In Figs. 1 and 2, there is shown a fish hook disgorger 10 of the present invention which is designed to be used with a fish line 12 to the end of which there is attached a common fish hook 14. The disgorger 10 is formed in an elongated, generally cylindrical shape so as to have a cylindrical body portion 16 and ends 18 and 20 leading to end openings 22 and 24. These ends are preferably tapered different amounts so that the end opening 22 is of smaller diameter than the end opening 24. If desired, only one of these ends can be tapered. Both of these end openings are, with the preferred construction, of smaller diameter than the body portion 16.

Within the end 18 there is formed a slot 26 extending generally parallel to the axis of the body portion 16 from the end opening 22. The portions 28 of the wall of the tapered end 18 immediately adjacent to the opening 22 overlap one another in the general manner shown in Fig. 3 of the drawing so as to in effect form a snap type of closure in the end of the slot 26. Thus, by deforming the portions 28 the fish line 12 may be snapped within the slot 26 so as to project through the slot out through the opening 22. In effect, the portion of the slot 26 remote from the end 18 acts as an opening into the interior of the body 16. A similar slot 30 is formed leading from the end opening 24.

In use, the fish line 12 is snapped into the slots 26 and 30 in the obvious manner so as to extend as indicated in Figs. 1 and 2 of the drawing. The entire device 10 is then moved slowly along the line 12 until the end 18 abuts against the curved portion of the hook 14. As this occurs the line is tightly held against the cylindrical body 16 and then force is applied to the disgorger 10 so as to force the hook 14 out of contact with the mouth 32 of a fish 34. The line 12 may be easily held against the body 16 by the pressure of the hand. Both the mouth 32 and the fish 34 are indicated in phantom in Fig. 1 of the drawing for ease of understanding the invention. After the hook has been dislodged, it is then removed from inside the fish by withdrawing the assembly, holding the line against the disgorger in the process to prevent sliding of the line through the two end slots and thus, the hook 14 may be easily worked out of the fish's mouth without causing damage. If desired, the operation can be performed utilizing the end 20 of the body 16. The choice of which end to use will depend upon the size of the mouth of the fish. For convenience, a small spring clip 36 having a cylindrical band portion 38 and an arm 40 is held upon the body 16. This clip may be used in carrying the disgorger 10 in a pocket or the like; it may be moved or even turned around upon the body 16 as desired for convenience in use. If desired, the clip 36 may be used instead of one of the slots 26 or 30, as indicated in Fig. 6, by merely passing a line through a slot at one end of the disgorger 10 designed to be used in engaging a hook and passing this line beneath the arm 40 of the clip 36 adjacent the body 16.

The disgorger 10 is a very efficient device for the purpose intended and may be readily cleaned by merely passing a brush or a stream of water through the central portion of this device. It is preferably formed out of a compartively strong, resilient, non-corrosive material such as, for example, a transparent, high impact strength polystyrene resin or the like, although it can also be formed out of various metals. By virtue of the cylindrical shape employed very little material is required to form the disgorger 10 while maintaining the strength of this disgorger to a sufficient extent where it can be conveniently used without danger of breaking or bending. This is extremely important with the instant invention inasmuch as it enables the disgorger 10 to be cheaply manufactured. It is also important because it enables the disgorger 10 to be of light and small enough construction so that no fisherman has any material objection to carrying it with him.

In Figs. 4 and 5 of the drawing, there is shown a modified fish hook disgorger 42 of the present invention which is primarily designed so as to be capable of being used for more than one purpose. This disgorger is formed in a similar manner to the disgorger 10 so as to include a generally cylindrical body portion 16' having a single tapered end 18' leading to an end opening 22'. A slot 26' of the category previously described is formed in the end 18' so as to lead from the end opening 22'. The other end 44 of the body portion 16' is of the same diameter as this body portion and is provided with internal threads 46 which are adapted to coact with similar threads 48 formed on a cap 50.

This cap 50, when placed in the position shown, is designed to be used in retaining various articles within the body portion 16' between a generally disk-shaped barrier 52 located transversely to the axis within the body portion 16'. As an example of such articles—bait, flies or lures, matches, weights or the like may be located within the space as indicated in the drawing. Upon the end of the cap 50 remote from the threads 48 there is formed a slot 54 in which there is secured a small stone 56 such as of carborundum or the like. This stone may be conviently employed in sharpening the point upon a fish hook or for other various related purposes.

Upon the disgorger 42 there is located a spring clip 36' of the category previously described. This clip may be used in holding an end of a fish line 12' in the manner previously described so that this line may be conveniently located against a fish hook 14'. On many occasions it is not necessary to completely snap a fish line of this category against the end of the disgorger utilized remote from the end of this disgorger which is intended to be placed within a fish's mouth. For this reason, a roughened exterior surface 58 such as, e.g., a knurled surface, is located around part of the cylindrical body portion 16' adjacent to the end 44. A fish line 12' may be easily guided or held against this surface using part of a hand. A similar surface can be employed upon the disgorger 10, or other disgorgers hereinafter described.

In Fig. 6 of the drawing there is shown another modified fish hook disgorger 60 of the present invention which is substantially identical to the disgorger 42 except for the fact that a small spring band 62 is placed around the end 44' of this structure. The band 62 is formed having a small slot 64 located therein which may be used in holding a fish line 12" in an operative position, in such a manner that the line may be easily moved with respect to the disgorger 60 during use.

In Fig. 7 of the drawing there is shown a modified cap 66 of the same category as the cap 50 previously described which is designed to be used with a disgorger such as the disgorger 42. This cap is formed so that a small compass 68 is located in the end of it remote from the body portion of a disgorger. On many occasions, the average fisherman is very desirous of having a compass of this category conveniently available for use in guiding him back to a given location.

In Fig. 8 of the drawing another modified structure of the present invention is illustrated. This structure is that of a fish hook disgorger 70 formed so as to include a cylindrical body portion 72 of uniform diameter having an open end 74. Extending from this open end 74 is a slot 76 projecting parallel to the axis of the body portion 72. This disgorger 70 is intended to be used with a fish line 12" in dislodging a hook 14". Both ends of the body portion 72 are preferably formed in identical manner. If desired, a spring clip such as the spring clip 36 previously described can be employed with it or with other similarly formed disgorgers as disclosed in this specification.

A disgorger 78 which is similar to the disgorger 70 in that it has a cylindrical body 80 with an open end 82 is illustrated in Fig. 9. This disgorger 78 differs from the disgorger 70 in that a slot 84 is formed so as to extend from the end 82 in a curved path about the axis of the body 80. It is believed that the manner in which the slot 84 is employed is obvious from the aforegoing description and from a detailed consideration of this figure. Both ends of the disgorger 78 may be formed identically if desired, or either of the disgorgers 70 or 78 can be formed so as to have one slot similar to the slot 76 in one end and one slot similar to the slot 84 in the other end thereof.

A portion of another modified fish hook disgorger 86 of this invention is shown in Figs. 10 and 11. This disgorger 86 is similar to the disgorgers 10, 70 and 78 previously described in that it includes a cylindrical body portion 88 having ends. One of these ends 90 is open and is formed at an angle to the axis of the body 88 so as to in effect be tapered or sloped with respect to the axis of the disgorger 86. Within the edge 92 of the end 90 which projects farthest from the body portion 88 there is formed a slot 94 similar to the end openings 22 and 24 previously described. The slot 94 is formed so that portions of the body 88 defining the entrance to this slot overlap one another in the manner illustrated in Fig. 11 and so that these portions are provided with curved edges 96. These edges 96 serve in guiding a fish line into operative position such as previously described and in preventing accidental dislodgement of the fish line from the interior of the disgorger 86 during its use. The structure of the disgorger 86 is considered to be particularly advantageous inasmuch as during use a fish hook automatically tends to go towards the side of the end 90 adjacent the center of the cylindrical body portion 88. Thus, little danger is involved of a hook being accidentally forced outward from the disgorger 83 through the slot 94 during use. This same type of sloping end structure may be employed with the end openings in any of the disgorgers disclosed in the specification.

The type of slot structure employed with the disgorgers 70 and 78 can be employed with the other disgorgers described, if desired, although this is not preferred. The disgorgers 70 and 78 are primarily designed for simplicity and ease of construction. Normally, an individual buying a fish hook disgorger is seeking, in a device of this category, an extremely effective device which is virtually fool-proof in operation. The type of structure utilized with slots such as the slot 26 previously described is to be considered the most effective, since with this type of structure it is virtually impossible for a fish line to go in an undesired path during use.

Those skilled in the art to which the invention pertains will realize that a wide number of different modifications may be made in structures utilizing the essential principles described in this application. As an example of such modification, the cap 50 may be attached through the use of a spring loaded hinge so that it need only be flipped to an open position instead of being screwed to such a position. Further, this cap can be used to enclose a chamber designed to retain other articles besides those specifically indicated. Thus, for example, when a disgorger such as the disgorger 42 is formed of a transparent plastic material it may be conveniently used to hold a fishing license or other similar article. Since a number of such modifications are possible without departing from the essential nature of this invention, this invention as defined by the appended claims is to be accorded wide scope.

I claim:

1. A fish hook disgorger which comprises: an elongated, generally cylindrical member having open ends, the exterior surface of said member adjacent said ends being of smaller diameter than the exterior surface of the principal portion of said member, said member being formed of a rigid, resilient, non-corrosive plastic material; means defining a slot having an end leading from each of said ends of said member, said slots being formed so that the walls of said member adjacent to said ends overlap one another so as to constitute snap closures for said slots, and so that the portions of said slots remote from said ends constitute openings into said member.

2. A fish hook disgorger which comprises: an elongated, generally cylindrical member having open ends, the exterior surface of said member adjacent said ends being of smaller diameter than the exterior surface of the principal portion of said member, said member being formed of a rigid, resilient, non-corrosive transparent plastic material; means defining a slot having an end leading from each of said ends of said member, said slots being formed so that the walls of said member adjacent to said ends overlap one another so as to constitute snap closures for said slots, and so that the portions of said slots remote from said ends constitute openings into said member.

References Cited in the file of this patent

UNITED STATES PATENTS

| | | |
|---|---|---|
| 399,866 | Gage | Mar. 19, 1889 |
| 1,611,544 | Maurus | Dec. 21, 1926 |
| 2,164,907 | Falkner | July 4, 1939 |
| 2,455,013 | Klinicki | Nov. 30, 1948 |
| 2,519,098 | Aye | Aug. 15, 1950 |
| 2,670,561 | Howorth et al. | Mar. 2, 1954 |
| 2,676,430 | Richard | Apr. 27, 1954 |

UNITED STATES PATENT OFFICE
Certificate of Correction

Patent No. 2,931,125 April 5, 1960

Mike Planin

It is hereby certified that error appears in the above numbered patent requiring correction and that the said Letters Patent should read as corrected below.

In the drawings, Figs. 10 and 11, as shown below, should be added as part of the Letters Patent:

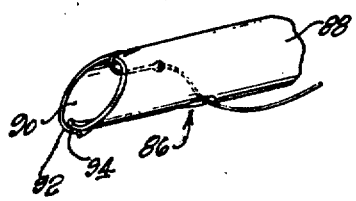 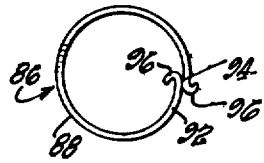

Signed and sealed this 22nd day of August 1961.

[SEAL]

Attest:
ERNEST W. SWIDER,
*Attesting Officer.*

DAVID L. LADD,
*Commissioner of Patents.*